United States Patent
Watanabe et al.

(10) Patent No.: US 8,277,150 B2
(45) Date of Patent: Oct. 2, 2012

(54) DETACHABLE INSERT-TYPE CUTTING TOOL

(75) Inventors: Shoichiro Watanabe, Shimotsuma (JP); Hidehiko Nagaya, Joso (JP); Norio Aso, Sashima-gun (JP); Yasuharu Imai, Shimotsuma (JP)

(73) Assignee: Mitsubishi Materials Corporation, Tokyo (JP)

( * ) Notice: Subject to any disclaimer, the term of this patent is extended or adjusted under 35 U.S.C. 154(b) by 607 days.

(21) Appl. No.: 12/585,138

(22) Filed: Sep. 4, 2009

(65) Prior Publication Data

US 2010/0178117 A1   Jul. 15, 2010

(30) Foreign Application Priority Data

Oct. 29, 2008 (JP) ................................. 2008-278307

(51) Int. Cl.
*B23B 27/10* (2006.01)
*B23B 27/04* (2006.01)

(52) U.S. Cl. ............. 407/11; 407/117; 407/107; 407/91

(58) Field of Classification Search .................... 407/11, 407/113, 117, 91, 110, 50, 109, 107, 111
See application file for complete search history.

(56) References Cited

U.S. PATENT DOCUMENTS

| | | | | |
|---|---|---|---|---|
| 4,579,488 A * | 4/1986 | Griffin | .......................... | 409/136 |
| 4,621,547 A * | 11/1986 | Yankoff | .......................... | 82/1.11 |
| 4,695,208 A * | 9/1987 | Yankoff | .......................... | 407/106 |
| 4,955,264 A * | 9/1990 | Armbrust | .......................... | 82/158 |
| 5,272,945 A * | 12/1993 | Lockard | .......................... | 82/1.11 |
| 5,388,487 A * | 2/1995 | Danielsen | .......................... | 82/158 |
| 5,709,508 A * | 1/1998 | Barazani et al. | .......................... | 407/101 |
| 5,718,156 A * | 2/1998 | Lagrolet et al. | .......................... | 82/1.11 |
| 5,833,403 A * | 11/1998 | Barazani | .......................... | 407/101 |
| 6,443,672 B1 * | 9/2002 | Lagerberg | .......................... | 407/2 |
| 7,568,864 B2 * | 8/2009 | Sjoo | .......................... | 407/11 |
| 7,703,359 B2 * | 4/2010 | Englund | .......................... | 82/1.11 |
| 7,959,384 B2 * | 6/2011 | Breisch | .......................... | 407/110 |
| 8,137,034 B2 * | 3/2012 | Noureddine | .......................... | 407/11 |

(Continued)

FOREIGN PATENT DOCUMENTS

CH        692449 A5    6/2002

(Continued)

OTHER PUBLICATIONS

International Search Report dated Dec. 28, 2009, issued on related PCT application, PCT/JP2009/005765.

(Continued)

*Primary Examiner* — Boyer D Ashley
*Assistant Examiner* — Sara Addisu
(74) *Attorney, Agent, or Firm* — Edwards Wildman Palmer LLP (57) ABSTRACT

The detachable insert-type cutting tool is provided with a holder, a head member which has an insert seat on which a cutting insert is detachably mounted and which is detachably attached to a head portion of the holder so that an attachment surface of the head member is closely in contact with an attachment surface of the holder, a coolant hole which is formed inside the holder so as to be opened on the attachment surface of the holder, and a first groove which is formed on the attachment surface of the head member, communicating with the coolant hole opened on the attachment surface of the holder and extending so as to be opened toward a cutting edge of the cutting insert mounted on the insert seat.

7 Claims, 7 Drawing Sheets

U.S. PATENT DOCUMENTS

| | | | |
|---|---|---|---|
| 2004/0161312 A1* | 8/2004 | Hole et al. | 407/101 |
| 2008/0038072 A1* | 2/2008 | Berminge et al. | 407/12 |
| 2010/0175519 A1* | 7/2010 | Deschenaux et al. | 82/1.11 |
| 2010/0178116 A1* | 7/2010 | Watanabe et al. | 407/11 |
| 2010/0322722 A1* | 12/2010 | Lin | 407/11 |

FOREIGN PATENT DOCUMENTS

| | | |
|---|---|---|
| EP | 1495821 A1 | 1/2005 |
| EP | 1495821 A1 * | 1/2005 |
| JP | 63-151203 | 10/1988 |
| JP | 4-67907 | 6/1992 |
| JP | 07-227702 A | 8/1995 |
| JP | 07227702 A * | 8/1995 |
| JP | 09-108923 A | 4/1997 |
| JP | 9-510149 | 10/1997 |
| JP | 2002-066830 A | 3/2002 |
| WO | WO-96/12592 A1 | 5/1996 |

OTHER PUBLICATIONS

Supplementary European Search Report dated Feb. 24, 2012, issued for the corresponding European patent application No. 09823341.4.

* cited by examiner

DETACHABLE INSERT-TYPE CUTTING TOOL

CROSS-REFERENCE TO RELATED APPLICATIONS

Priority is claimed on Japanese Patent Application No. 2008-278307, filed Oct. 29, 2008, the content of which is incorporated herein by reference.

BACKGROUND OF THE INVENTION

1. Field of the Invention

The present invention relates to a detachable insert-type cutting tool in which a head member is detachably mounted on a head portion of a holder and a cutting insert is also detachably attached to an insert seat formed on the head member.

2. Description of the Related Art

For example, Published Japanese Translation No. H09-510149 of the PCT International Application has proposed a tool which is able to communicate with coolant supply means for supplying a coolant to the vicinity of a cutting edge, as a tool for cutting the bottom of a hole formed on a workpiece. The tool is provided with a fluid inlet orifice arranged near an adaptor end portion and a fluid outlet orifice arranged at the leading end of an adaptor mounting portion above an insert retaining portion, in which a coolant hole extending substantially along an adaptor is formed at an adaptor mounting portion (head member) between the fluid inlet orifice and the fluid outlet orifice. The fluid inlet orifice is coupled with a coolant duct array of a tool shank (holder) to communicate with the coolant supply means. In this case, the coolant duct array of the tool shank extends along the tool shank and ends with a transverse coolant hole located at a tool-shank retaining portion in an area between the rear end of the retaining portion and a screw hole. The transverse coolant hole has at least one outlet portion so as to align with the fluid inlet orifice of the adaptor.

The inventor and others of the present invention have also proposed in Japanese Published Unexamined Patent Application No. H07-227702 a groove-forming tool which is provided with a tip (cutting insert), a holder for mounting the tip, a supporter mounted on the holder to support the tip, and a clamp piece mounted on the holder to press the tip toward the supporter, thereby fixing the tip. An ejection port for ejecting a cutting fluid toward a flank of the tip in a groove subjected to groove-forming and a cutting fluid supply hole for supplying the cutting fluid to the ejection port are formed on the supporter of the groove-forming tool. An ejection port for ejecting the cutting fluid toward a rake surface of the tip in a groove and a cutting fluid supply hole for supplying the cutting fluid to the ejection port are formed on the clamp piece. Then, the cutting fluid supply holes on the supporter and the clamp piece communicate with a cutting fluid supply hole formed on the holder at parts on which the supporter and the clamp piece are in contact with the holder. Further, Published European Patent Application EP 1495821 has also proposed a tool in which a coolant is ejected toward a cutting edge.

In the detachable insert-type cutting tool described in Published Japanese Translation No. H09-510149 of the PCT International Application and that described in Japanese Published Unexamined Patent Application No. H07-227702, a coolant supplied via a coolant hole formed on a holder is ejected toward a cutting edge through coolant holes and cutting fluid supply holes formed on an adaptor mounting portion (head member), a supporter and a clamp piece. However, the adaptor mounting portion, the supporter, the clamp piece and others are needed for drilling by using a drill or the like to result in an increase in production cost. In particular, as found in the tool for groove-forming a workpiece described in Published Japanese Translation No. H09-510149 of the PCT International Application and Japanese Published Unexamined Patent Application No. H07-227702, when the size of a part to be drilled is restricted depending on the width of a groove formed on the workpiece, it is difficult to drill into the workpiece. There are also fears that a failure in forming a sufficiently large ejection port may result in a failure in securing a necessary quantity of coolant supplied to a cutting edge.

Further, in the detachable insert-type cutting tool described in Published Japanese Translation No. H09-510149 of the PCT International Application and that described in Japanese Published Unexamined Patent Application No. H07-227702, a coolant hole formed along a direction of the center axis (longitudinal direction) of a holder in the shape of a shaft is once bent in a radial direction with respect to the center axis thereof, thereby communicating with an adaptor mounting portion, a supporter, a coolant hole on a clamp piece, and a cutting fluid supply hole. Then, the coolant hole and the cutting fluid supply hole are also bent and formed so as to eject a coolant toward a cutting edge. The holder, the adaptor mounting portion, the supporter and the clamp piece are drilled from an outer circumferential surface in the direction of the center axis and in the radial direction and, thereafter, openings of unnecessary holes formed on the outer circumferential surface must be sealed with a plug or the like. The above-described problem is also found in the tool described in Published European Patent Application EP 1495821. In particular, a tool for cutting an inner circumferential surface of a hole has a cutting edge which protrudes in a radial direction with respect to the center axis of a holder. Therefore, a coolant hole must be bent from a direction of the center axis of the holder to a direction at which the cutting edge protrudes and this tool always entails the above-described problem.

The present invention has been made under the above-described circumstances, an object of which is to provide a detachable insert-type cutting tool in which at least a head member does not need to be drilled with a drill or the like to reduce production costs and secure a necessary supply quantity of coolant and, in particular, when used as a tool for cutting an inner surface of a hole, a coolant is supplied in a sufficient quantity to a cut site, thus making it possible to secure cooling and lubrication.

SUMMARY OF THE INVENTION

The detachable insert-type cutting tool of the present invention is provided with a holder, a head member which has an insert seat on which a cutting insert is detachably mounted and which is detachably attached to a head portion of the holder so that an attachment surface of the head member is closely in contact with an attachment surface of the holder, a coolant hole which is formed inside the holder so as to be opened on the attachment surface of the holder, and a first groove which is formed on the attachment surface of the head member, communicating with the coolant hole opened on the attachment surface of the holder and extending so as to be opened toward a cutting edge of the cutting insert mounted on the insert seat.

In the above-described detachable insert-type cutting tool, a coolant supplied from the coolant hole of the holder is hit against the attachment surface of the holder and that of the head member which are closely in contact with each other and ejected through the first groove formed on the head member of the attachment surface toward the cutting edge of the cutting insert mounted on an insert seat. In this case, an opening on the attachment surface of the first groove formed on the attachment surface of the head member is sealed by the attachment surface of the holder which is closely in contact with the attachment surface of the head member. In other words, there is formed the coolant hole for ejecting a coolant toward the cutting edge of the cutting insert between the first groove and the attachment surface of the holder.

Therefore, it is only necessary to form the first groove on the attachment surface of the head member, which is easier in process than a case where a hole having an inner circumferential surface continuing over the entire circumference is drilled with a drill or the like. It is also possible to adjust a cross-sectional area of the coolant hole depending on the dimensions of the first groove. Further, the coolant hole formed with the first groove and the attachment surface of the holder extends so as to be bent with respect to the coolant hole of the holder. Where the present invention is applied to a tool in which a holder is formed in the shape of a shaft so as to extend along a center axis, a coolant hole extends in a direction of the center axis inside the holder, and a cutting edge of a cutting insert is mounted on a head member so as to protrude in a radial direction with respect to the center axis, for example, a tool for cutting the inner surface of a hole, a component such as a plug or the like is not needed and a coolant can be reliably supplied toward the cutting edge protruding in the radial direction as described above.

The detachable insert-type cutting tool of the present invention may further be provided with an upper jaw portion and a lower jaw portion both formed on the head member in which the cutting insert may be mounted on the insert seat so as to be interposed between the upper and lower jaw portions and the first groove may be formed at the upper jaw portion positioned on a rake surface of the cutting edge of the cutting insert.

According to the present invention, since a coolant is supplied from the rake surface to the cutting edge of cutting insert, it is possible to cool and lubricate a site cut by the cutting edge more effectively.

In the detachable insert-type cutting tool of the present invention, a second groove extending along the first groove of the head member may be formed on the attachment surface of the holder so as to be opened toward the cutting edge of the cutting insert. The coolant hole formed by the first and second grooves is further increased in cross-sectional area, thus making it possible to eject a coolant in a greater quantity toward the cutting edge.

According to the present invention, it is possible to supply a coolant in a sufficient quantity toward the cutting edge of the cutting insert without forming a coolant hole in the head member. It is, thereby, possible to reduce production costs, supply the coolant reliably to a cut site and improve cooling and lubrication effects. As a result, it is possible to reduce cutting resistance, extend the life of the cutting edge, and attain stable and smooth processing.

DESCRIPTION OF THE PREFERRED EMBODIMENTS

FIG. 1 to FIG. 8 show one embodiment in which the present invention is applied to a detachable insert-type cutting tool used in inner-diameter processing for groove-forming an inner circumferential surface of a hole formed along the rotating axis of a workpiece which rotates. A main body 1 of the cutting tool in the present embodiment is provided with a holder 10 having an outer shape formed approximately in a cylindrical shape centering around the center axis O and a head member 20 detachably attached to a head portion of the holder 10 (a left-side portion in FIG. 2 and FIG. 4 and a right-side portion in FIG. 3). The head member 20 is provided with a cutting insert 30 having a cutting edge 31 and detachably attached to the head member 20. The cutting edge 31 of the cutting insert constitutes a cutting edge portion 40 which protrudes in one radial direction with respect to the center axis O (a downward direction in FIG. 2, a rightward direction in FIG. 5, and a leftward direction in FIG. 6).

The holder 10 is made with a steel member or the like, and the rear end portion thereof (a right-side portion in FIG. 2 and FIG. 4, a left-side portion in FIG. 3) is given as a shank portion 11, with the cylindrical shape kept as it is. At the upper and lower portions thereof, there is formed a pair of flat recessed surfaces 12 which are parallel to the center axis O, parallel to each other as well and along the protruding direction. Then, the shank portion 11 is retained in a state where the rotation is stopped by these recessed surfaces 12, by which the holder 10 is fixed to a working machine.

Further, the head portion of the holder 10 is formed in a cylindrical shape in which an outer shape of the shank portion 11 is slightly smaller in outer diameter than the shank portion 11 and the top end portion of the holder 10 is markedly greater in outer diameter than the head portion thereof and formed in a circular disk shape having an outer diameter approximately equal to that of the shank portion 11. At this head portion, of two directions perpendicular to the center axis O and parallel to the recessed surface 12 (a vertical direction in FIG. 2 and a lateral direction in FIG. 5 and FIG. 6), a part of the head portion facing the above-described protruding direction has an inclination surface 13A extending to the leading end approximately from the center of the head portion in a direction of the center axis O so as to be inclined to the inner circumference and a flat surface 13B parallel to the center axis O and extending further from the inclination surface 13A to the leading end. A cutout portion is formed on the part facing the above-described protruding direction by the inclination surface 13A and the flat surface 13B.

At an upper surface portion of the head portion of the holder 10, there are formed an inclination surface 15A slowly inclined from the inclination surface 13A so as to face the inner circumference as the inclination surface 15A moves to the leading end from a position closer to the shank portion 11 than the inclination surface 13A and a flat surface 15B parallel to the center axis O further extending from the inclination surface 15A to the leading end and also perpendicular to the flat surface 13B. The flat surface 15B intersects the leading end surface 14 of the holder 10. At a portion where the flat surface 15B intersects the leading end surface 14, a counterbored portion 15C which is inclined more steeply than the inclination surface 15A and which also has a bottom surface inclined to an inner circumference as the counterbored portion 15C moves to the leading end is formed so as to be opened on the leading end surface 14. A screw hole is formed perpendicularly on the bottom surface of the counterbored portion 15C into which a clamping screw 16 is screwed. Further, at a portion facing the opposite side of the protruding direction of the head portion of the holder 10, there is formed a closed-end hollow (dimple) 17 which is recessed in an oval sphere shape and extending in a direction of the center axis O.

The leading end surface 14 of the holder 10 is given as an attachment surface of the holder 10 in the present embodiment. Except for a raised portion 14A formed at a lower surface portion opposite to the counterbored portion 15C, the leading end surface 14 is formed in the shape of a flat surface perpendicular to the center axis O, and accordingly, perpendicular to the flat surfaces 13B and 15B. At a corner where the leading end surface 14 intersects the flat surface 13B facing the protruding direction, a recessed portion 14B extending in a direction perpendicular to the flat surface 15B is formed at the lower surface portion so as to be recessed markedly in a parallel from the flat surface 13B including the side of the raised portion 14A in the protruding direction. Further, two spanner screw holes 14C into which spanner screws 18 for fixing the head member 20 are screwed are formed on a bottom surface facing the protruding direction of the recessed portion 14B and the leading end surface 14.

Then, a coolant hole 19 for supplying a coolant which has been fed from the working machine is formed inside the above-described holder 10. After extending to the leading end along the center axis O from the rear end surface of the holder 10, the coolant hole 19 extends so as to be inclined approximately from the central part of the head portion of the holder 10 in a direction of the center axis O to the protruding direction and also to the upper surface portion with respect to the center axis O. Then, the coolant hole 19 is opened at a corner where the flat surface 13B of the leading end surface 14 intersects the flat surface 15B thereof so as to be away from the counterbored portion 15C and the recessed portion 14B. It is noted that the coolant hole 19 is made greater in diameter at a part extending along the center axis O, while it is made smaller in diameter at a part inclined from the center axis O and opened on the leading end surface 14 than the part extending along the center axis O.

Further, the head member 20 is made with a steel member or the like, and an L-shaped recessed portion 21A into which the raised portion 14A of the leading end surface 14 of the holder 10 is fitted, is formed at a lower edge of an externally flat-shaped main body 21. A raised portion 21B which is formed in a rectangular plate-shape and fitted into the recessed portion 14B, is integrally formed on one of the side surfaces 22 of the main body 21 so as to protrude perpendicularly. Two through holes 21C into which the spanner screws 18 are inserted are formed at the raised portion 21B and the main body 21.

The raised portion 21B is fitted into the recessed portion 14B in such a manner that the raised portion 14A is fitted into the recessed portion 21A, by which the one of the side surfaces 22 is closely in contact with the leading end surface 14 of the holder 10 and the two spanner screws 18 inserted into the respective through holes 21C, or a total of four screws 18, are screwed into these screw holes 14C from the leading end in the direction of the center axis O and in the protruding direction. Thereby, the head member 20 is fixed at the head portion of the holder 10, with a thickness direction of the main body 21 directed at the center axis O. Therefore, in the present embodiment, one of the side surfaces 22 of the main body 21 being closely in contact with the leading end surface 14, which is the attachment surface of the holder 10, is given as the attachment surface of the head member 20.

Thus, a slit-shaped insert seat 23 extending around the center axis O of the holder 10 in the protruding direction is formed on the main body 21 of the head member 20 attached to the holder 10 in such a manner as to go through the main body 21 in the thickness direction and open in the protruding direction. The main body 21 is separated by the insert seat 23 into a lower jaw portion 24 into which the spanner screw 18 is inserted including the raised portion 21B and an upper jaw portion 25 which connects with the lower jaw portion 24 on the opposite side of the protruding direction and which is arranged opposite to the lower jaw portion 24 behind the insert seat 23.

The upper jaw portion 25 is formed in the shape of an inclination surface so that a surface thereof facing a protruding direction is raised gradually as the surface moves to the opposite side of the protruding direction. The end of the upper jaw portion 25 is positioned inside of an outer diameter of a cylinder formed by the shank portion 11 in a radial direction with respect to the center axis O. On the other hand, a surface facing the protruding direction of the lower jaw portion 24 is formed so as to give approximately a raised circular-arc surface centering around the center axis O. Further, the raised circular arc is greater in radius than the cylinder formed by the shank portion 11, thereby protruding in the protruding direction. It is noted that the thickness of a part at which these upper and lower jaw portions 24, 25 protrude in a direction of the center axis O is smaller than the length of a cutting edge 31 of a cutting insert 30 to be described later.

Further, at a base end of the above protruded part in the upper jaw portion 25, a wall surface portion 25A is formed on one of the side surfaces 22 in the shape of a flat surface which is arranged in a direction perpendicularly intersecting the side surface 22. This wall surface portion 25A is substantially flush with the flat surface 13B to communicate therewith, facing the protruding direction in the attachment state. Further, a counterbored portion 25B is formed on an upper surface of the upper jaw portion 25. The counterbored portion 25B has a circular bottom surface with the bottom surface of the counterbored portion 15C of the holder 10 in the above attachment state. The bottom surface of the counterbored portion 25B includes a step so as to protrude markedly from the bottom surface of the counterbored portion 15C.

The insert seat 23 formed between the upper and lower jaw portions 24, 25 is formed in such a manner that the mutually opposing upper and lower surfaces of the lower jaw portion 24 and the upper jaw portion 25 are provided with the respective cross sections formed in an inverted V shape, when viewed in the protruding direction. A contact surface facing the protruding direction is formed between the upper and lower surfaces behind the insert seat 23 on the opposite side of the protruding direction. Further, toward the opposite side of the protruding direction from the contact surface, a slit 23A narrower in width than an interval of the insert seat 23 is formed in such a manner that a connecting part 26 of the upper and lower jaw portions 24, 25 remains without arriving at a side surface facing the opposite side of the protruded direction of the main body 21.

Figure 1:
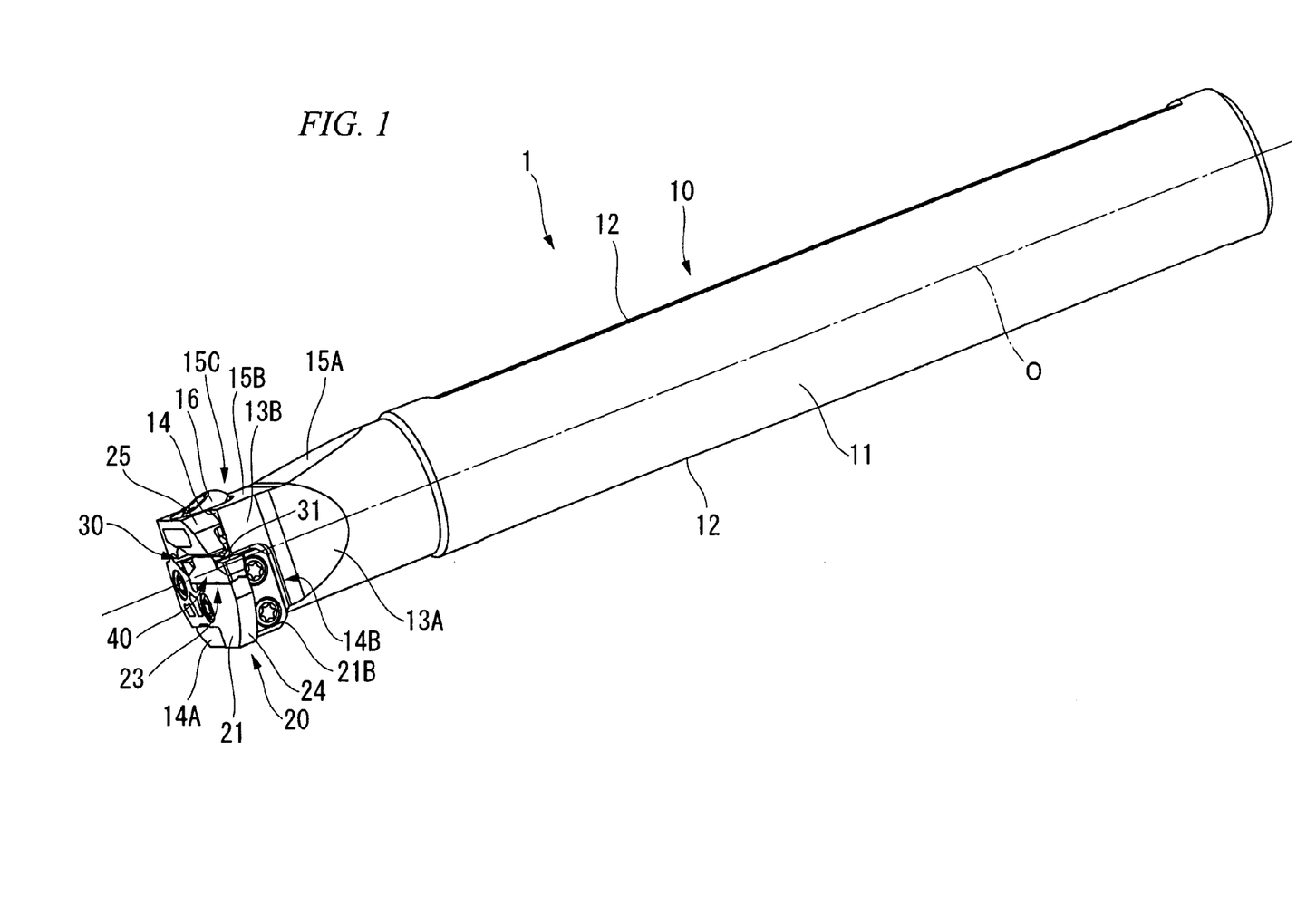
FIG. 1 is a perspective view showing a first embodiment of a cutting tool of the present invention.
Figure 2:
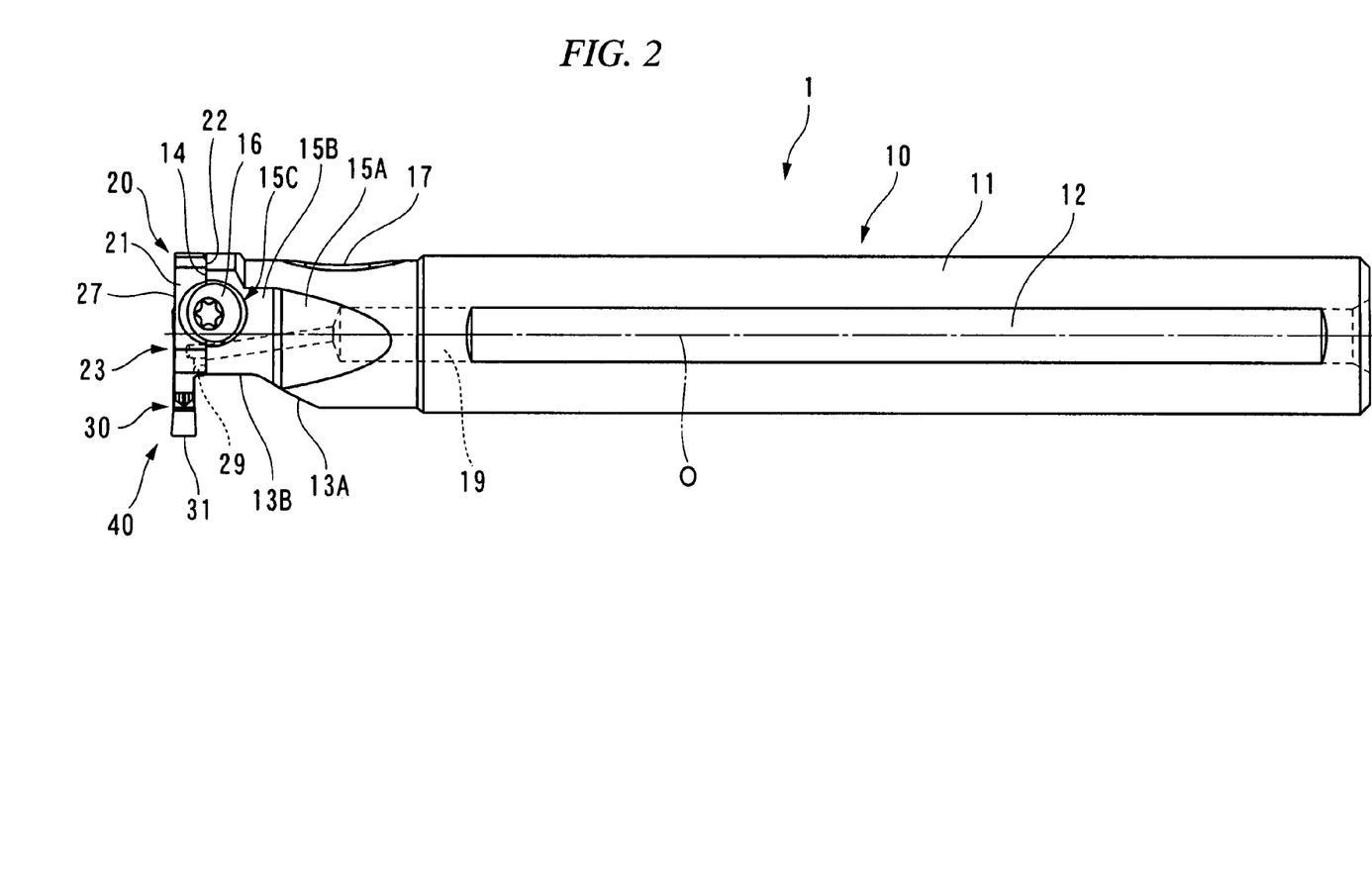
FIG. 2 is a plan view of the embodiment shown in FIG. 1.
Figure 3:
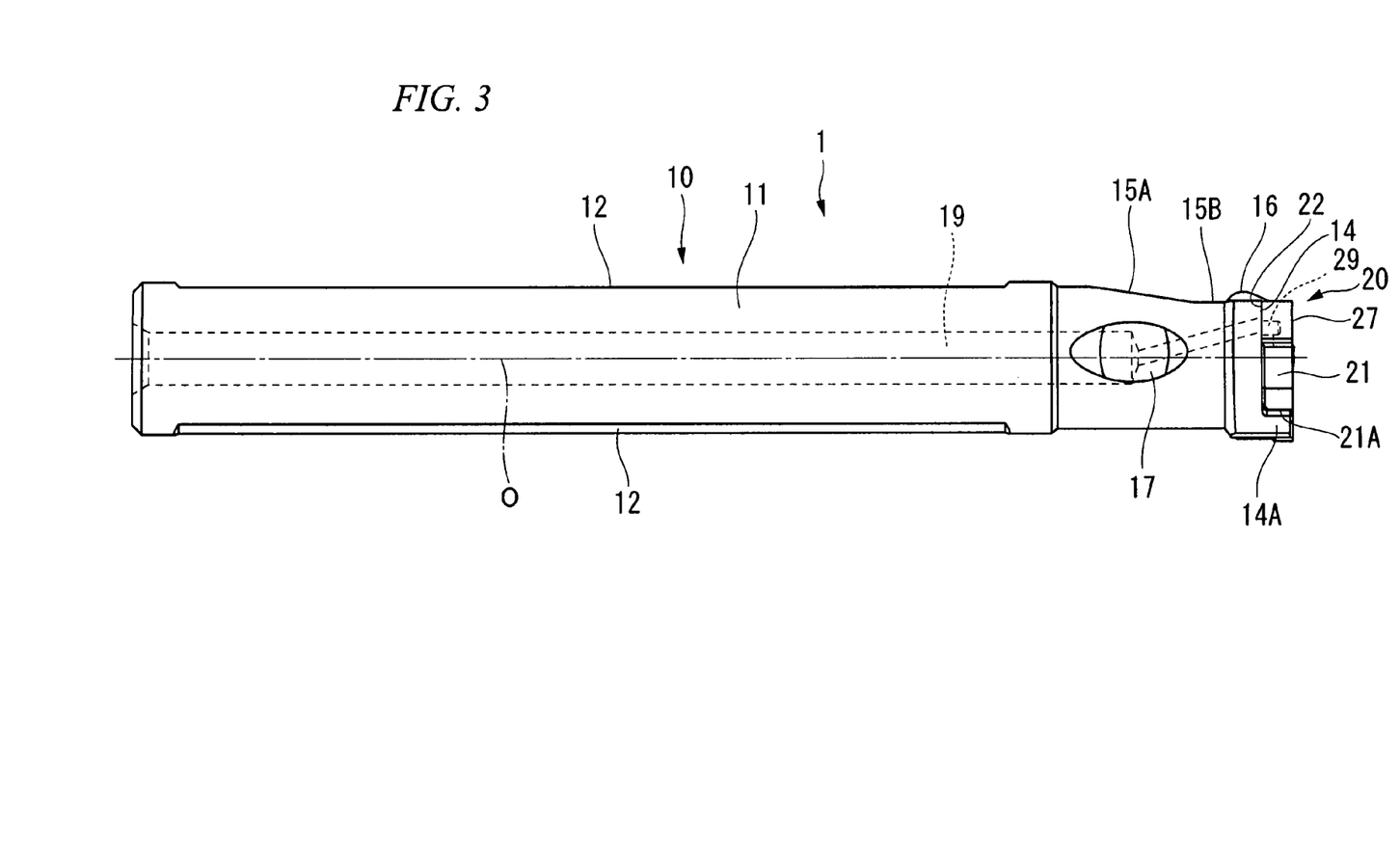
FIG. 3 is a side view of the embodiment shown in FIG. 1 when viewed on the opposite side of a direction at which a cutting edge portion 40 protrudes.
Figure 4:
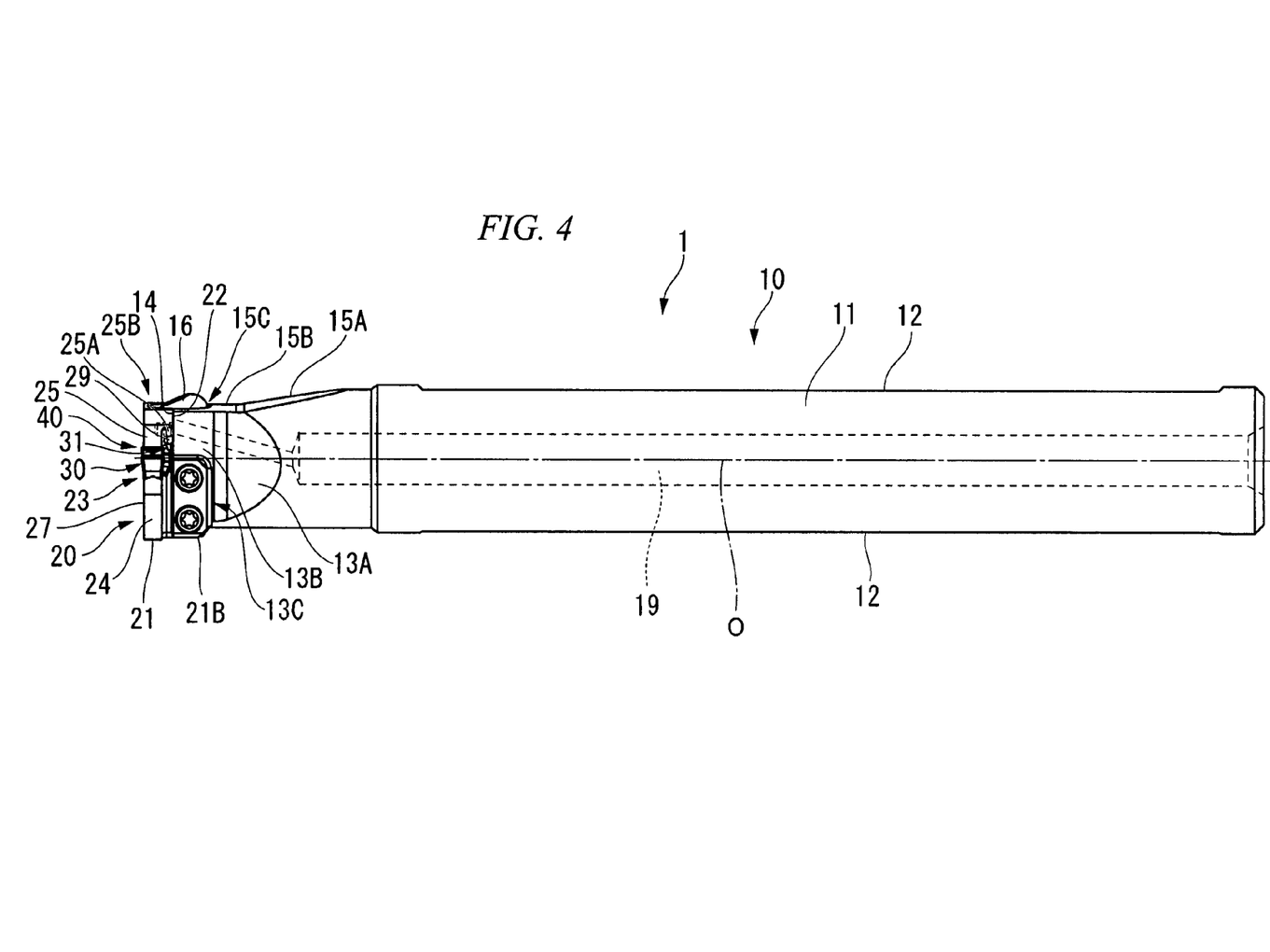
FIG. 4 is a side view of the embodiment shown in FIG. 1 when viewed from a direction at which the cutting edge portion 40 protrudes.
Figure 5:
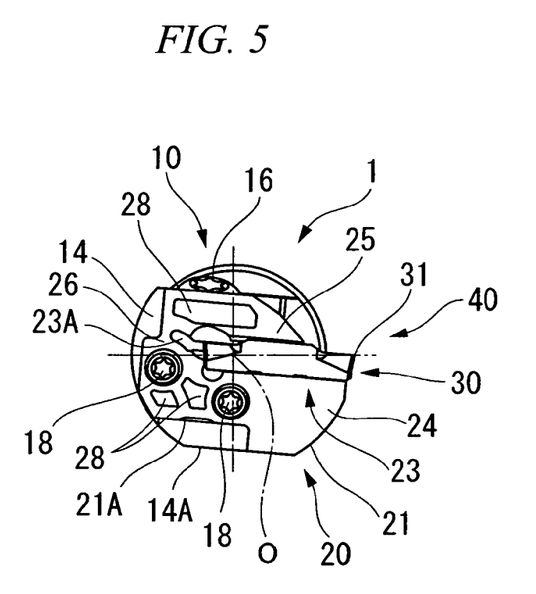
FIG. 5 is a view of the embodiment shown in FIG. 1 when viewed from the leading end in a direction of the center axis O.
Figure 6:
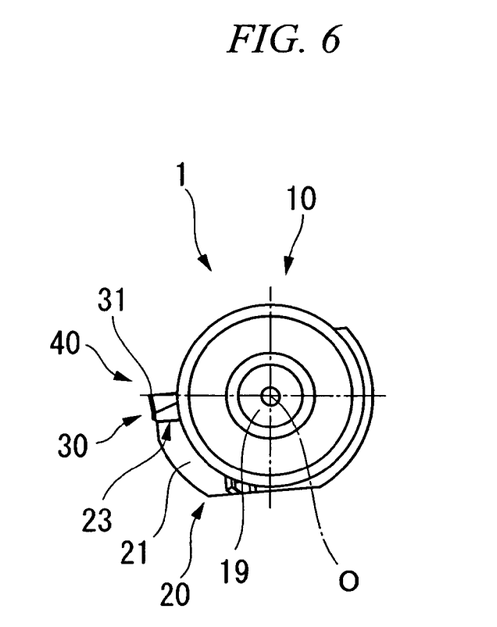
FIG. 6 is a view of the embodiment shown in FIG. 1 when viewed from the rear end in the direction of the center axis O.
Figure 7:
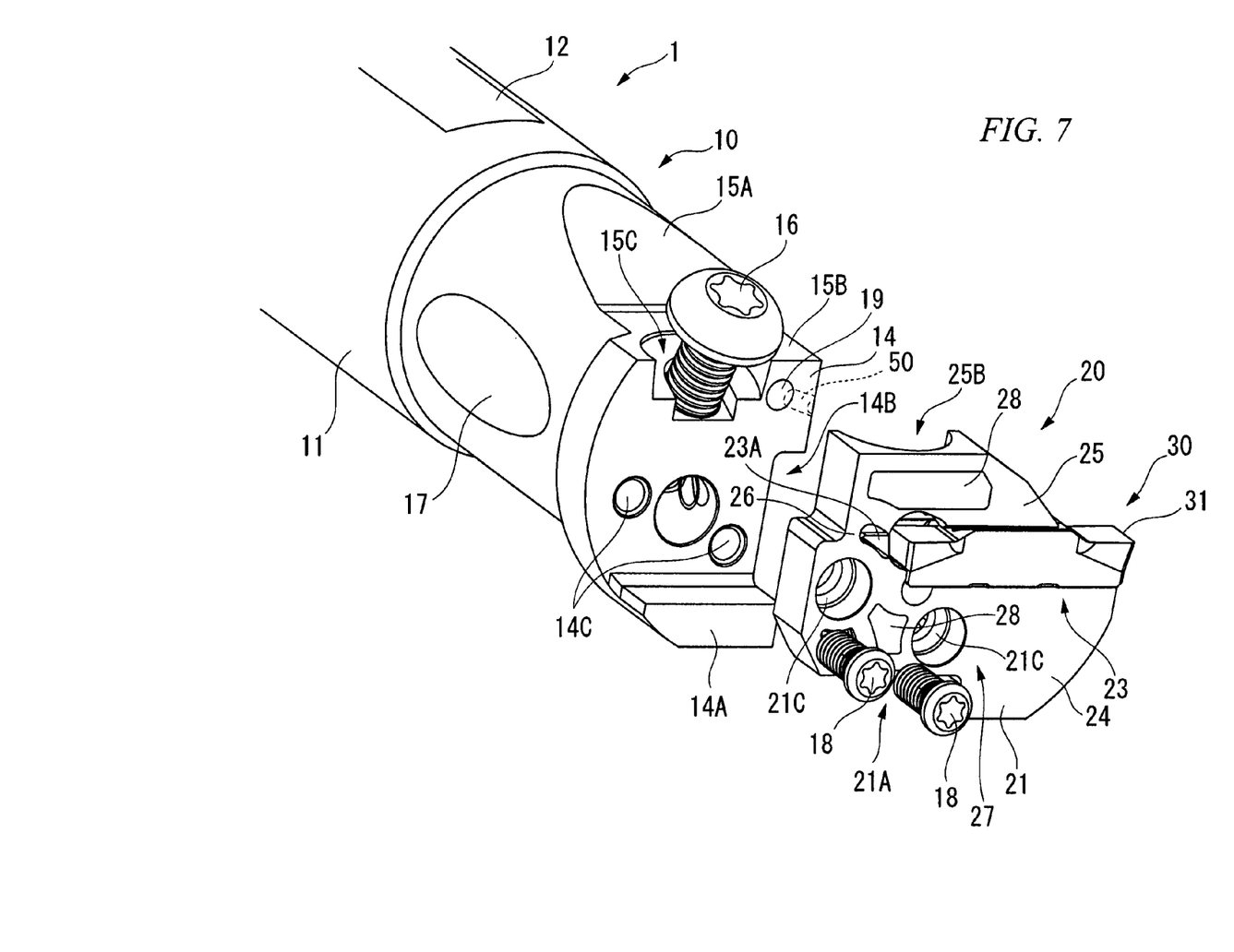
FIG. 7 is an exploded perspective view of a state where a head member 20 is detached from a holder 10 in the embodiment shown in FIG. 1 when viewed from the leading end.
Figure 8:
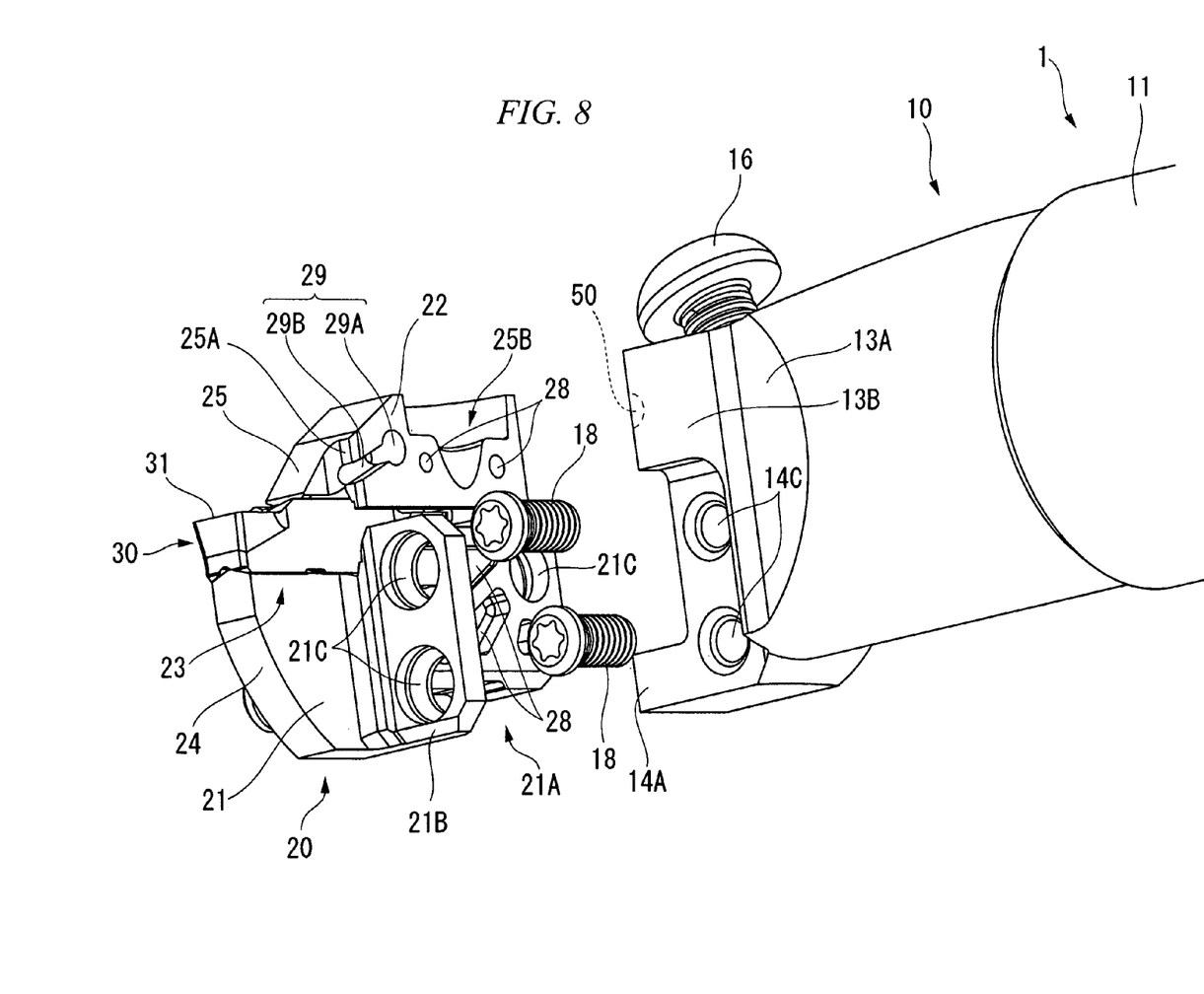
FIG. 8 is an exploded perspective view of a state where the head member 20 is detached from the holder 10 in the embodiment shown in FIG. 1 when viewed from the rear end.

In this instance, as shown in FIG. 5, while being bent at the upper jaw portion 25 toward the opposite side of the protruding direction, the slit 23A is formed so as to extend in a circular-arc shape coaxial with one of the through holes 21C on the main body 21 into which the spanner screws 18 are inserted on the opposite side of the protruding direction. It is preferable that a center angle of the circular arc made by the slit 23A be within a range of 20° to 50°. Further, the connecting part 26 remaining between the slit 23A and a side surface facing the opposite side of the protruding direction of the main body 21 is gradually increased in thickness (the thickness along a direction formed by a circular arc made by the slit 23A) as the connecting part 26 moves to the rear end of the holder 10 in a direction of the center axis O.

Further, a plurality of recesses 28 are formed on one of the side surfaces 22 and the other of the side surfaces 27 facing the leading end in the above attachment state on the opposite side of the side surface 22 in the main body 21 of the head member 20. The recesses 28 have inner wall surfaces continuing circumferentially and a bottom surface continuing to the inner wall surface over the entire circumference and which are recessed from the other of the side surfaces without going through the main body 21 of the head member 20. It is preferable that the shape of the recesses 28 formed on the side surface 22 be different from that of the recesses 28 formed on the side surface 27 when viewed from a direction opposing both of these side surfaces 22, 27. Further, a plurality of recesses 28 may be different in depth when viewed from the side surface.

The main body 21 of the head member 20 having these recesses 28 can be produced by an MIM method (Metal Injection Molding) in which, for example, a material prepared by mixing a raw material of fine steel powders and a binder such as plastic to give fluidity is subjected to ejection molding inside a divided mold at which the shape of the head member 20 is reversed and the binder is thereafter removed thermally to sinter the raw material of fine powders. Specifically where the main body 21 is produced according to the MIM method, it is preferable that a volume of the recess 28 is ranged from 2% to 15% based on a volume of the main body 21 free of the recesses 28. It is also preferable that after sintering, the top surface of the main body 21 is subjected to shot peening.

Then, on one of the side surfaces 22 which is given as the attachment surface of the head member 20, there is formed a grooved recessed portion (first groove) 29 so as to communicate with the coolant hole 19 opened on the leading end surface 14 which is the attachment surface of the holder 10 in the attachment state. The grooved recessed portion 29 includes a closed-end hole portion 29A recessed perpendicularly from the side surface 22 and a groove portion 29B extending from the hole portion 29A. The hole portion 29A is formed at a part of the side surface 22 in the upper jaw portion 25 along the protruding direction away from the counterbored portion 25B and the recesses 28 so that an opening on the side surface 22 is in alignment with an opening of the coolant hole 19 on the leading end surface 14 in the above attachment state.

The groove portion 29B is formed so as to have a U-shaped cross section which is slightly smaller in depth and groove width than the depth and diameter of the hole portion 29A. The groove portion 29B extends so as to move to the insert seat 23 from the hole portion 29A along the protruding direction and is opened on the wall surface portion 25A of the upper jaw portion 25. With regard to the grooved recessed portion 29 as well, in producing the main body 21 of the head member 20 according to the MIM method, as with formation of the recesses 28, a projected streak at which the grooved recessed portion 29 is reversed in shape may be formed on a divided mold.

A cutting insert 30 attached to the insert seat 23 of the above-described head member 20 is formed with a hard material such as a cemented carbide in the shape of a rectangular rod, with the outer shape being an approximately rectangular cross section, and arranged between the upper and lower jaw portions 24, 25 of the insert seat 23. Both of the lower and upper central parts of the cutting insert 30 are formed so as to give a V-groove cross section, while the upper and lower jaw portions 24, 25 of the insert seat 23 are raised so as to give an inverted V-cross section. Then, the lower surface of the cutting insert 30 can make contact with the lower jaw portion 24 and the upper central part of the cutting insert 30 can make contact with the upper jaw portion 25 in such a manner that the respective V-shaped bisectors are allowed to be in alignment with each other. Further, rake surfaces are formed at the respective positions retracted markedly from the central part on both ends of the upper surface, and a cutting edge 31 used in groove-forming is formed at both end edges of the rake surfaces.

The above-described cutting insert 30 is inserted into the insert seat 23 along a radial direction perpendicular to the center axis O from the protruding direction, with one of the cutting edges 31 directed toward the protruding direction, in such a manner that, as described above, the lower surface and the upper central part of the cutting insert 30 are respectively allowed to be in contact with the upper and lower surfaces of the upper and lower jaw portions 24, 25 of the insert seat 23 in a sliding manner. Further, the end surface of the cutting insert 30 continuing to the other of the cutting edges 31 is in contact with the contact surface of the insert seat 23 beyond the center axis O, by which the end surface is positioned in the radial direction with respect to the center axis O and seated on the insert seat 23.

Then, a head-equipped clamping screw 16 is screwed into a screw hole of the counterbored portion 15C, pressing the counterbored portion 25B of the upper jaw portion 25 by using the head, by which the upper jaw portion 25 undergoes elastic deformation so as to sag to the lower jaw portion 24 based on the connecting part 26. The cutting insert 30 is fixed on the insert seat 23 so as to be clamped between the upper jaw portion 25 and the lower jaw portion 24.

Further, one of the cutting edges 31 of the cutting insert 30 pointed at the protruding direction in a clamped state is arranged in parallel with the center axis O of the holder 10. Then, in such a manner that a distance from the center axis O is made slightly greater than the radius of a raised circular arc formed by a surface of the lower jaw portion 24 facing in the protruding direction, the cutting edge 31 in the detachable insert-type cutting tool protrudes most greatly to the outer circumference in the radial direction from the center axis O. Accordingly, the above-described cutting edge portion 40 is constituted. The groove portion 29B of the grooved recessed portion 29 extends so as to be opened toward one of the cutting edges 31.

As described above, the thus constituted detachable insert-type cutting tool is inserted into a hole of a workpiece rotating around the rotating axis from the leading end, with the center axis O being parallel to the rotating axis. Then, the cutting tool is fed in the protruding direction at a position subjected to groove-forming, thereby the hole is grooved on the inner circumferential surface by using one of the cutting edges 31. At this time, a coolant supplied from the rear end surface of the holder 10 via a coolant hole 19 flows into a hole portion 29A of the grooved recessed portion 29 on the head member 20 communicating with the coolant hole 19. An opening on the side surface 22 of the groove portion 29B is sealed by the leading end surface 14 of the holder 10 at the grooved recessed portion 29. Therefore, the coolant flown into the hole portion 29A is guided into the groove portion 29B and ejected from an opening formed on the wall surface portion 25A of the upper jaw portion 25. The thus ejected coolant is supplied to one of the cutting edges 31 of the cutting insert 30, thereby cooling and lubricating the cutting edge 31 and a cut site of the workpiece.

As described so far, the opening of the grooved recessed portion 29 formed on the side surface 22 of the head member 20 is sealed by the leading end surface 14 of the holder 10, communicating with the coolant hole 19, thereby forming a coolant hole through which a coolant is ejected to the cutting edge 31. Thus, as compared with a case where the head member 20 is drilled with a drill or the like to form a hole having the inner circumferential surface continuing over the entire circumference, the head member 20 can be easily processed. For example, in order to form the grooved recessed portion 29 on the main body 21 of the head member 20, the hole portion 29A is formed on the side surface 22 by using a drill, and the groove portion 29B may be formed by using an end mill or the like so as to extend from the hole portion 29A. Therefore, high degree of processing accuracy is not required as compared with the case where a hole portion is further formed by using a drill at the hole portion 29A for communication.

Further, specifically where the head member 20 is formed according to the above-described MIM method, in order to form on the head member 20 a hole having the inner circumferential surface continuing over the entire circumference in such a manner as to communicate with the hole portion 29A, it is necessary that a pin which can move up and down is provided on a divided mold or a core cylinder is arranged inside the divided mold and removed after ejection molding. Accordingly, there is a possibility that increased molding costs or extended working hours will result. However, in the head member 20 of the above-constituted detachable insert-type cutting tool, only a projected streak may be formed on a surface on which the side surface 22 of the divided mold is formed according to the grooved recessed portion 29, by which processing can be done more easily.

In the detachable insert-type cutting tool of the present embodiment, a coolant hole is formed with the grooved recessed portion 29 and the leading end surface 14 of the holder 10. Thus, for example, as with the present embodiment, where the groove portion 29B of the grooved recessed portion 29 is formed so as to give a U-shaped cross section, as compared with the formation of a hole with a circular cross section centering at a position equal to a semi-circle which is equal in diameter to the groove width of the groove portion 29B and formed by the groove bottom of the groove portion 29B, it becomes possible to secure at the coolant hole a cross-sectional area larger than the cross-sectional area of this hole. Therefore, a coolant can be supplied in a greater quantity to the cutting edge 31 to result in more efficient cooling and lubrication. As a result, it is possible to reduce cutting resistance and provide smooth processing. It is also possible to extend the life of the cutting edge 31 and attain stable processing over a longer period.

Further, in a detachable insert-type cutting tool used in inner diameter processing as described in the present embodiment, a coolant hole 19 is formed on an axial holder 10 extending along the center axis O so as to extend in a direction of the center axis O. On the other hand, a cutting edge 31 of a cutting insert 30 is arranged in a head member 20 so as to protrude in a radial direction with respect to the center axis O. Therefore, the coolant hole 19 is required to be bent midway and turned to the radial direction. Where the thus bent coolant hole is formed by drilling with a drill, drilling is given from the outer circumference of a cutting tool main body so that the holes communicate with each other and, thereafter, openings of unnecessary holes are required to be sealed by screwing a plug. In the detachable insert-type cutting tool of the present embodiment, a coolant hole is formed with a grooved recessed portion 29 and the leading end surface (the attachment surface of the holder 10) 14. Also, the coolant hole may be formed such that the grooved recessed portion 29 is curved. It is, therefore, not necessary to provide components such as a plug or to form an internal thread inside an opening of a hole into which the plug is screwed. Thereby, the coolant hole can be bent and formed more easily to reduce production costs.

Still further, in the present embodiment, the insert seat 23 to which the cutting insert 30 is attached is fixed by placing the cutting insert 30 between upper and lower jaw portions 24, 25 formed on the head member 20 to clamp the cutting insert 30. On the other hand, the grooved recessed portion 29 for ejecting a coolant is formed at the upper jaw portion 25 positioned on a rake surface of the cutting edge 31 of the cutting insert 30 among the upper and lower jaw portions 24, 25. Therefore, the coolant can be more effectively supplied from the rake surface to the cutting edge 31 and a site of a workpiece cut by the cutting edge 31, thereby further improving the cooling and lubrication effects.

In addition, in the present embodiment, the grooved recessed portion 29 is opened not at an end part of the upper jaw portion 25 pressing the cutting insert 30 but at a wall surface portion 25A of the base end further retracted. Therefore, even where the grooved recessed portion 29 is formed as described above, there is no chance that the upper jaw portion 25 is damaged due to rigidity more than necessary or the cutting insert 30 is attached unstably.

Also, a surface facing the protruding direction of the upper jaw portion 25 is formed in the shape of an inclination surface so as to be raised gradually as the surface moves to the opposite side of the protruding direction, thereby chips generated by the cutting edge are discharged along the surface. In the present embodiment, as described above, the grooved recessed portion 29 is opened at the wall surface portion 25A, by which a coolant can be supplied between the thus discharged chips and the rake surface to prevent failure in supplying the coolant due to the chips.

In the present embodiment, the grooved recessed portion 29 is formed only on the side surface 22 which is the attachment surface of the head member 20. However, for example, as indicated by the broken lines in FIG. 7 and FIG. 8, in a state where the holder 10 is attached to the head member 20, a groove (second groove) 50 extending along the grooved recessed portion 29 of the head member 20 may also be formed on the leading end surface 14 which is the attachment surface of the holder 10. In this case, a coolant can be ejected in a greater quantity to the cutting edge 31 and a cut site to attain improvement of further cooling and lubrication effects.

In the present embodiment, a description is given for a case where the present invention is applied to a detachable insert-type cutting tool used in inner-diameter processing and also in groove-forming. The present invention is also applicable to a detachable insert-type cutting tool used in outer-diameter processing for cutting the outer circumferential surface of a rotating workpiece, a detachable insert-type cutting tool for cutting an end surface, and a detachable insert-type cutting tool used in cut-off processing and screw cutting processing other than groove-forming.

A description has been so far given for preferred embodiments of the present invention, to which the present invention shall not be restricted.

Additions, omissions, substitutions, and other modifications can be made without departing from the spirit or scope of the present invention. The present invention shall not be restricted to the above description but will be restricted only by the scope of the attached claims.

What is claimed is:

1. A detachable insert-type cutting tool, comprising:
   a holder;
   a head member which has an insert seat on which a cutting insert is detachably mounted and which is detachably attached to a head portion of the holder so that an attachment surface of the head member is closely in contact with an attachment surface of the holder;
   a coolant hole which is formed inside the holder so as to be opened on the attachment surface of the holder; and
   a first groove which is formed on the attachment surface of the head member, communicating with the coolant hole opened on the attachment surface of the holder and extending so as to be opened toward a cutting edge of the cutting insert mounted on the insert seat, wherein a second groove extending along the first groove of the head member is formed on the attachment surface of the holder so that a coolant passageway is defined between a surface of said first groove and said second groove to be opened toward the cutting edge of the cutting insert.

2. The detachable insert-type cutting tool according to claim 1, further comprising:
   an upper jaw portion and a lower jaw portion which are both formed on the head member; wherein
   the cutting insert is mounted on the insert seat so as to be interposed between the upper and lower jaw portions, and
   the first groove is formed at the upper jaw portion which is positioned on a rake surface of the cutting edge of the cutting insert.

3. The detachable insert-type cutting tool according to claim 2, wherein a second groove extending along the first groove of the head member is formed on the attachment surface of the holder so as to be opened toward the cutting edge of the cutting insert.

4. The detachable insert-type cutting tool according to claim 3, wherein
   the holder is formed in the shape of a shaft extending along the center axis,
   the coolant hole extends in the direction of the center axis, and
   the cutting insert is mounted on the head member so that the cutting edge of the cutting insert protrudes in a radial direction with respect to the center axis.

5. The detachable insert-type cutting tool according to claim 2, wherein
   the holder is formed in the shape of a shaft extending along the center axis,
   the coolant hole extends in the direction of the center axis, and
   the cutting insert is mounted on the head member so that the cutting edge of the cutting insert protrudes in a radial direction with respect to the center axis.

6. The detachable insert-type cutting tool according to claim 1, wherein
   the holder is formed in the shape of a shaft extending along a center axis,
   the coolant hole extends in a direction of the center axis, and
   the cutting insert is mounted on the head member so that the cutting edge of the cutting insert protrudes in a radial direction with respect to the center axis.

7. The detachable insert-type cutting tool according to claim 1, wherein
   the holder is formed in the shape of a shaft extending along the center axis,
   the coolant hole extends in the direction of the center axis, and
   the cutting insert is mounted on the head member so that the cutting edge of the cutting insert protrudes in a radial direction with respect to the center axis.

* * * * *